(12) United States Patent
Jouin et al.

(10) Patent No.: US 9,213,397 B2
(45) Date of Patent: Dec. 15, 2015

(54) CHANGING POWER MODES OF A MICROCONTROLLER SYSTEM

(71) Applicant: Atmel Corporation, San Jose, CA (US)

(72) Inventors: Sebastien Jouin, La Chapelle-Launay (FR); Romain Oddoart, Petit-Mars (FR); Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 266 days.

(21) Appl. No.: 13/788,366

(22) Filed: Mar. 7, 2013

(65) Prior Publication Data

US 2014/0089707 A1 Mar. 27, 2014

Related U.S. Application Data

(60) Provisional application No. 61/703,979, filed on Sep. 21, 2012.

(51) Int. Cl.
*G06F 1/32* (2006.01)

(52) U.S. Cl.
CPC ............ *G06F 1/3243* (2013.01); *G06F 1/3296* (2013.01); *Y02B 60/1239* (2013.01); *Y02B 60/1285* (2013.01)

(58) Field of Classification Search
CPC . G06F 1/3243; G06F 1/3296; Y02B 60/1239; Y02B 60/1285; Y02B 60/1282
See application file for complete search history.

(56) References Cited

U.S. PATENT DOCUMENTS

| | | |
|---|---|---|
| 4,475,134 A | 10/1984 | Bowden et al. |
| 4,677,566 A | 6/1987 | Whittaker et al. |
| 4,703,486 A | 10/1987 | Bemis |
| 5,579,498 A | 11/1996 | Ooi |
| 5,623,234 A | 4/1997 | Shaik et al. |
| 6,163,851 A | 12/2000 | Yamazoe et al. |
| 6,175,891 B1 * | 1/2001 | Norman et al. ................... 711/5 |
| 6,255,878 B1 | 7/2001 | Gauvin et al. |
| 6,320,717 B1 * | 11/2001 | Feng ............................... 360/75 |
| 6,393,080 B1 | 5/2002 | Kamoshida et al. |
| 6,462,830 B1 | 10/2002 | Negishi |
| RE38,108 E * | 5/2003 | Chee ..................... G06F 1/3218 345/212 |
| 6,754,836 B2 | 6/2004 | Shimizue et al. |
| 6,848,055 B1 | 1/2005 | Yarch |
| 7,203,855 B2 | 4/2007 | Chou |
| 7,391,250 B1 | 6/2008 | Chuang |
| 7,574,683 B2 | 8/2009 | Wilson |
| 7,895,458 B2 | 2/2011 | Kim |

(Continued)

OTHER PUBLICATIONS

US Notice of Allowance in U.S. Appl. No. 13/785,999, dated Sep. 10, 2015, 16 pages.

(Continued)

*Primary Examiner* — Thomas Lee
*Assistant Examiner* — Chad Erdman
(74) *Attorney, Agent, or Firm* — Fish & Richardson P.C.

(57) ABSTRACT

A microcontroller system can operate in a number of power modes. In response to changing from a previous mode to a present mode, the microcontroller system reads a present calibration value correspond to the present mode from system configuration storage and write the present calibration value to a configuration register for a component. A logic block for the component reads the present calibration value and calibrates the component.

18 Claims, 4 Drawing Sheets

(56) References Cited

U.S. PATENT DOCUMENTS

| | | |
|---|---|---|
| 8,190,931 B2 | 5/2012 | Laurenti et al. |
| 8,255,722 B2 | 8/2012 | Pedersen et al. |
| 2003/0006807 A1 | 1/2003 | Masuda et al. |
| 2003/0177404 A1* | 9/2003 | Jorgenson et al. ............ 713/300 |
| 2003/0183024 A1 | 10/2003 | Lohberg et al. |
| 2003/0198108 A1 | 10/2003 | Hausmann et al. |
| 2004/0148548 A1 | 7/2004 | Moyer |
| 2004/0158773 A1* | 8/2004 | Kang ........................... 714/30 |
| 2005/0083081 A1 | 4/2005 | Jacobson et al. |
| 2007/0260794 A1 | 11/2007 | Ashish et al. |
| 2008/0072094 A1 | 3/2008 | Hayano et al. |
| 2008/0189455 A1* | 8/2008 | Dreps et al. .................. 710/106 |
| 2008/0211559 A1 | 9/2008 | Tanaka |
| 2009/0135751 A1 | 5/2009 | Hodges |
| 2009/0153210 A1 | 6/2009 | Wang et al. |
| 2009/0204835 A1 | 8/2009 | Smith et al. |
| 2009/0256607 A1 | 10/2009 | Smith et al. |
| 2009/0259863 A1 | 10/2009 | Williams et al. |
| 2010/0156458 A1 | 6/2010 | Speers |
| 2010/0306570 A1 | 12/2010 | Uchida et al. |
| 2011/0060931 A1 | 3/2011 | Radhakrishnan |
| 2011/0131427 A1 | 6/2011 | Jorgenson et al. |
| 2011/0138200 A1 | 6/2011 | Tomizawa |
| 2011/0208888 A1 | 8/2011 | Park |
| 2011/0221483 A1 | 9/2011 | Liu et al. |
| 2011/0252251 A1 | 10/2011 | De Cesare et al. |
| 2011/0264902 A1 | 10/2011 | Hollingworth |
| 2012/0017099 A1* | 1/2012 | David ................ G06F 1/3203 713/300 |
| 2012/0047402 A1 | 2/2012 | Chen et al. |
| 2012/0120958 A1 | 5/2012 | Mahadevan et al. |
| 2012/0268995 A1* | 10/2012 | Sugimoto et al. ........ 365/185.11 |
| 2013/0063114 A1 | 3/2013 | Agrawal et al. |
| 2013/0067250 A1 | 3/2013 | Wu et al. |
| 2013/0073878 A1 | 3/2013 | Jayasimha et al. |
| 2013/0097445 A1* | 4/2013 | Palaniappan et al. ......... 713/323 |
| 2013/0124895 A1 | 5/2013 | Saha et al. |
| 2013/0339589 A1* | 12/2013 | Qawami et al. ............... 711/103 |
| 2014/0089706 A1 | 3/2014 | Menard et al. |
| 2014/0089708 A1 | 3/2014 | Menard et al. |
| 2014/0089714 A1 | 3/2014 | Pedersen et al. |
| 2014/0281648 A1 | 9/2014 | Russell et al. |
| 2014/0301152 A1* | 10/2014 | Cox et al. ..................... 365/222 |
| 2015/0095681 A1 | 4/2015 | Jouin et al. |

OTHER PUBLICATIONS

US Final Office Action in U.S. Appl. No. 13/786,042, dated Sep. 10, 2015, 13 pages.
US Non-Final Office Action in U.S. Appl. No. 14/043,445, dated Aug. 25, 2015, 12 pages.
US Final Office Action in U.S. Appl. No. 13/789,902, dated Sep. 2, 2015, 18 pages.
US Non-Final Office Action in U.S. Appl. No. 12/400,690, dated Sep. 12, 2011, 7 pages.
US Final Office Action in U.S. Appl. No. 12/400,690, dated Jan. 11, 2012, 7 pages.
US Notice of Allowance in U.S. Appl. No. 12/400,690, dated May 9, 2012, 6 pages.
Non-Final Office Action dated Mar. 12, 2015, U.S. Appl. No. 13/786,042, filed Mar. 5, 2013 (14 pages).
U.S. Appl. No. 13/785,999, non-final office action dated Mar. 25, 2015, 12 pages.
U.S. Appl. No. 13/789,902, filed Mar. 8, 2013, non-final office action dated May 15, 2015, (15 pages).

* cited by examiner

CHANGING POWER MODES OF A MICROCONTROLLER SYSTEM

CROSS-REFERENCE TO RELATED APPLICATIONS

This application claims the benefit and priority of U.S. Provisional Application Ser. No. 61/703,979, filed Sep. 21, 2012, the entire contents of which is hereby incorporated by reference.

TECHNICAL FIELD

This disclosure relates generally to electronics and more particularly to microcontroller systems.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes.

Conventional power reduction solutions for saving power in a microcontroller require that the clock to the Central Processing Unit (CPU) or peripheral modules be switched off, typically by implementing one or more sleep modes in the microcontroller. Microcontroller systems may require a number of internal calibration values. For microcontroller systems with one or more sleep modes, the number of internal calibration values rises. These calibration values are typically frozen and defined at the design level.

SUMMARY

A microcontroller system can operate in a number of power modes. In response to changing from a previous mode to a present mode, the microcontroller system reads a present calibration value correspond to the present mode from system configuration storage and write the present calibration value to a configuration register for a component. A logic block for the component reads the present calibration value and calibrates the component.

Particular implementations of the microcontroller system can provide one or more of the following advantages: 1) when changing between power modes, the microcontroller system can perform a complex calibration process without intervention from a user system; 2) various calibration values for power modes can be stored in a system configuration storage, providing flexibility in adapting current calibration values and adding new calibration values; and 3) a user system (e.g., a user device coupled to the microcontroller system) can still override stored system calibration values.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
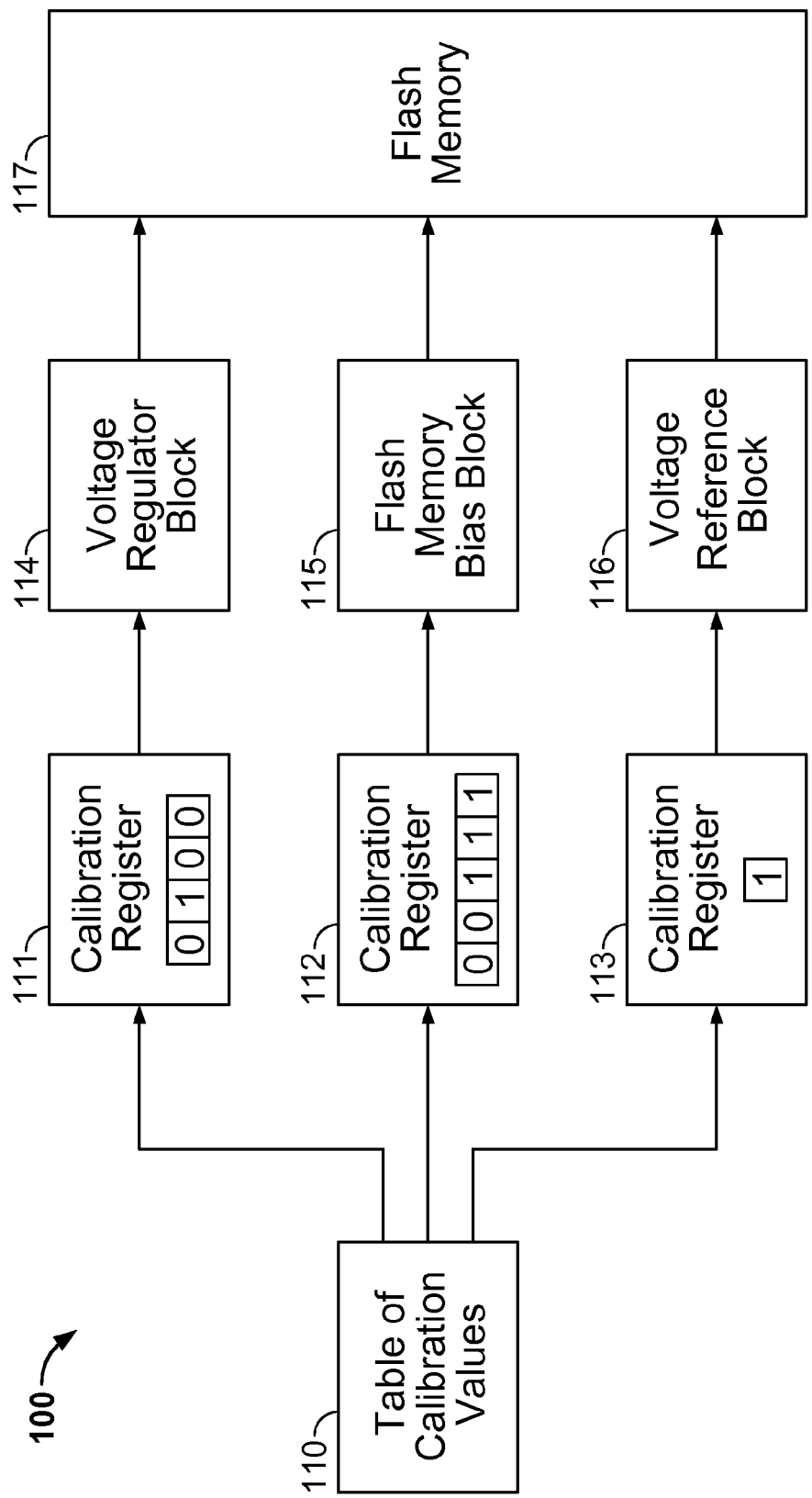
FIG. 1 is a block diagram of an example microcontroller system.

FIG. 1 is a block diagram of an example microcontroller system 100. The microcontroller system includes three calibration registers 111, 112, and 113, each coupled to a respective logic block 114, 115, and 116.

The voltage regulator block 114 controls a voltage regulator that provides a voltage to, e.g., a flash memory module 117. In some implementations, the voltage regulator provides a scalable output value. The voltage regulator block reads one or more configuration values and calibrates the voltage regulator. For example, the voltage regulator block can read a target voltage from the calibration register, or a control bit to control whether to operate in a higher or lower current capability mode.

The flash memory bias block 115 controls a bias voltage or bias current that is provided to the flash memory module. The bias voltage or current is used by the flash memory module, e.g., to generate a reference current for comparison with a current used to bias a memory cell. The flash memory bias block reads one or more calibration values and calibrates the bias voltage or current. For example, the flash memory bias block can read a target bias current or voltage from the calibration register.

The voltage reference block 116 controls a reference voltage circuit, e.g., a bandgap reference voltage circuit, that provides a reference voltage, e.g., to the flash memory module. The voltage reference block can read a control bit from the calibration register and enable or disable the reference voltage circuit.

The microcontroller system includes system configuration storage storing a table of calibration values 110. The table includes calibration values for each of the voltage regulator block, the flash memory bias block, and the voltage reference block for various power scaling modes. The system configuration storage can be, for example, a reserved portion of the flash memory, e.g., a fuse table.

The microcontroller system may be configured to operate in either a primary power mode using a primary supply voltage or a secondary power mode using a secondary supply voltage. In some implementations, the voltage regulator provides the primary supply voltage or the secondary supply voltage or both. In some other implementations, the microcontroller system draws the primary supply voltage or the secondary supply voltage or both from an external source.

In some implementations, for each of the primary and secondary power modes, the microcontroller system may be further configured to operate in a run mode, in which the system operates with most or all of its functionality, or a sleep mode, in which some components or features of the system are disabled, e.g., to save power. In those implementations, in total, there are four different modes of operation: primary/run, primary/sleep, secondary/run, and secondary/sleep.

The table of calibration values includes, for each of the logic blocks and for each of the modes, one or more calibration values. Whenever the microcontroller system changes from a previous mode to a present mode, the microcontroller system reads the calibration values corresponding to the present mode from the table of calibration values and writes the calibration values to the appropriate calibration registers.

For example, a power manager of the microcontroller can read and write the values upon changing modes.

Example Power Configuration Scenario

Figure 2:
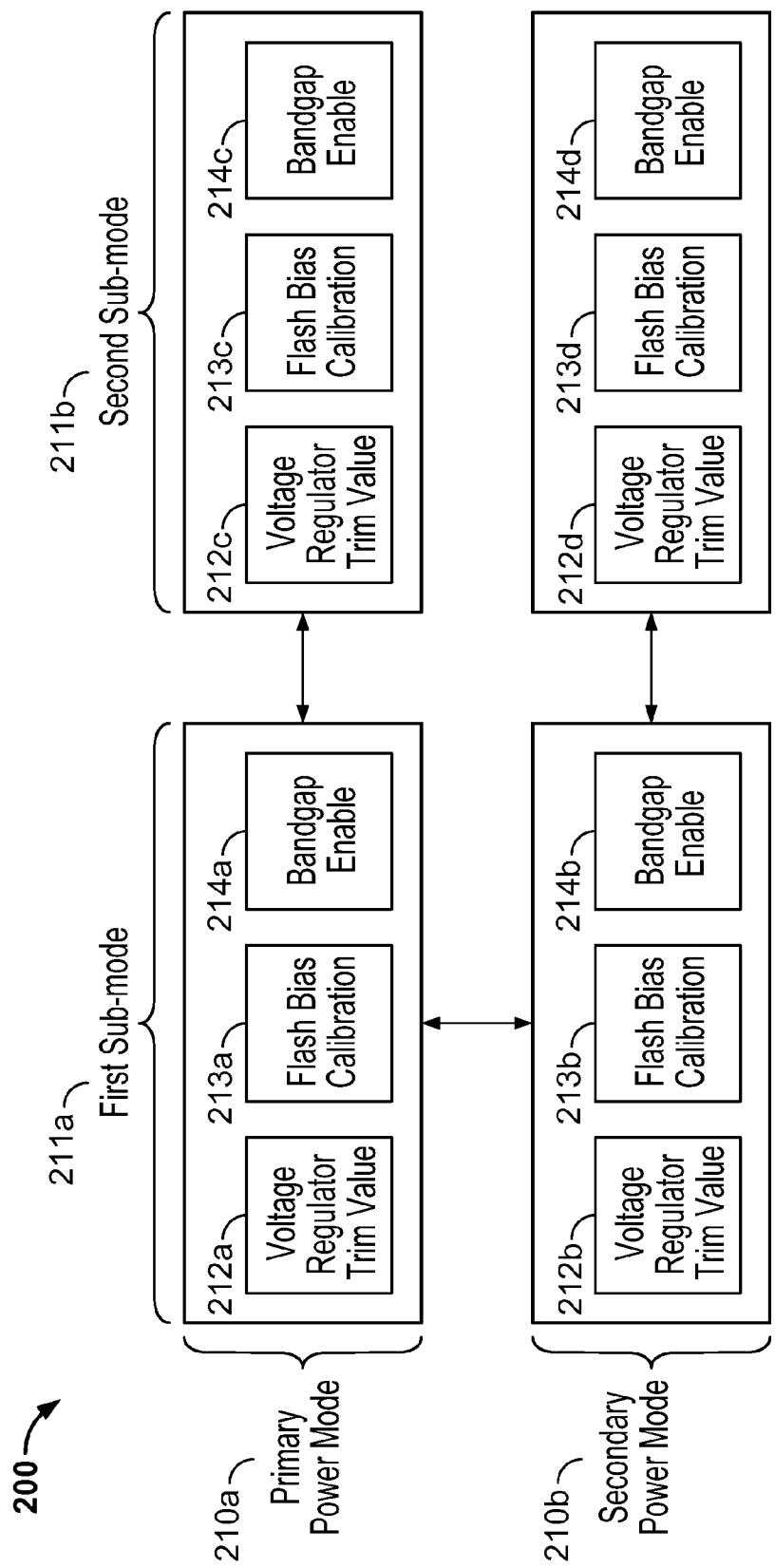
FIG. 2 is a conceptual diagram illustrating calibration values for four different power modes of a microcontroller system, e.g., the microcontroller system of FIG. 1.

FIG. 2 is a conceptual diagram 200 illustrating calibration values for four different power modes of a microcontroller system, e.g., the microcontroller system 100 of FIG. 1. The diagram includes a row 210a for the primary power mode and a row 210b for the secondary power mode. The diagram also includes a column 211a for a first sub-mode, e.g., a run mode, and a column 211b for a second sub-mode, e.g., a sleep mode.

In the run mode of the primary power mode, the voltage regulator trim value 212a is "normal," the flash bias calibration value 213a is "normal," and the bandgap enable value is "on." In the sleep mode of the primary power mode, the voltage regulator trim value 212c is "normal," the flash bias calibration value 213c is "normal," and the bandgap enable value is "off."

In the run mode of the secondary power mode, the voltage regulator trim value 212b is "low power." The trim value or one or more other values can specify a target voltage lower than the normal voltage. The flash bias calibration value 213b is "low power." Because the flash memory module behavior can be affected by the power supply voltage, it may be useful to calibrate one or more of the flash memory module's parameters, e.g., the bias voltage or current, to obtain the best access time for each supply voltage. The bandgap enable value 214b is "on." In the sleep mode of the secondary power mode, the voltage regulator trim value 212d is "low power," the flash bias calibration value 213d is "low power," and the bandgap enable value is "off."

In some implementations, the microcontroller system enters the run mode before changing between the primary or secondary power modes. For example, if the system is in the primary power mode and the sleep sub-mode, the system changes to the run mode before changing to the run sub-mode or sleep sub-mode of the secondary power mode. Similarly, if the system is in the secondary power mode and the sleep sub-mode, the system changes to the run mode before changing to the run sub-mode or sleep sub-mode of the primary power mode.

Example System Including User Interface

Figure 3:
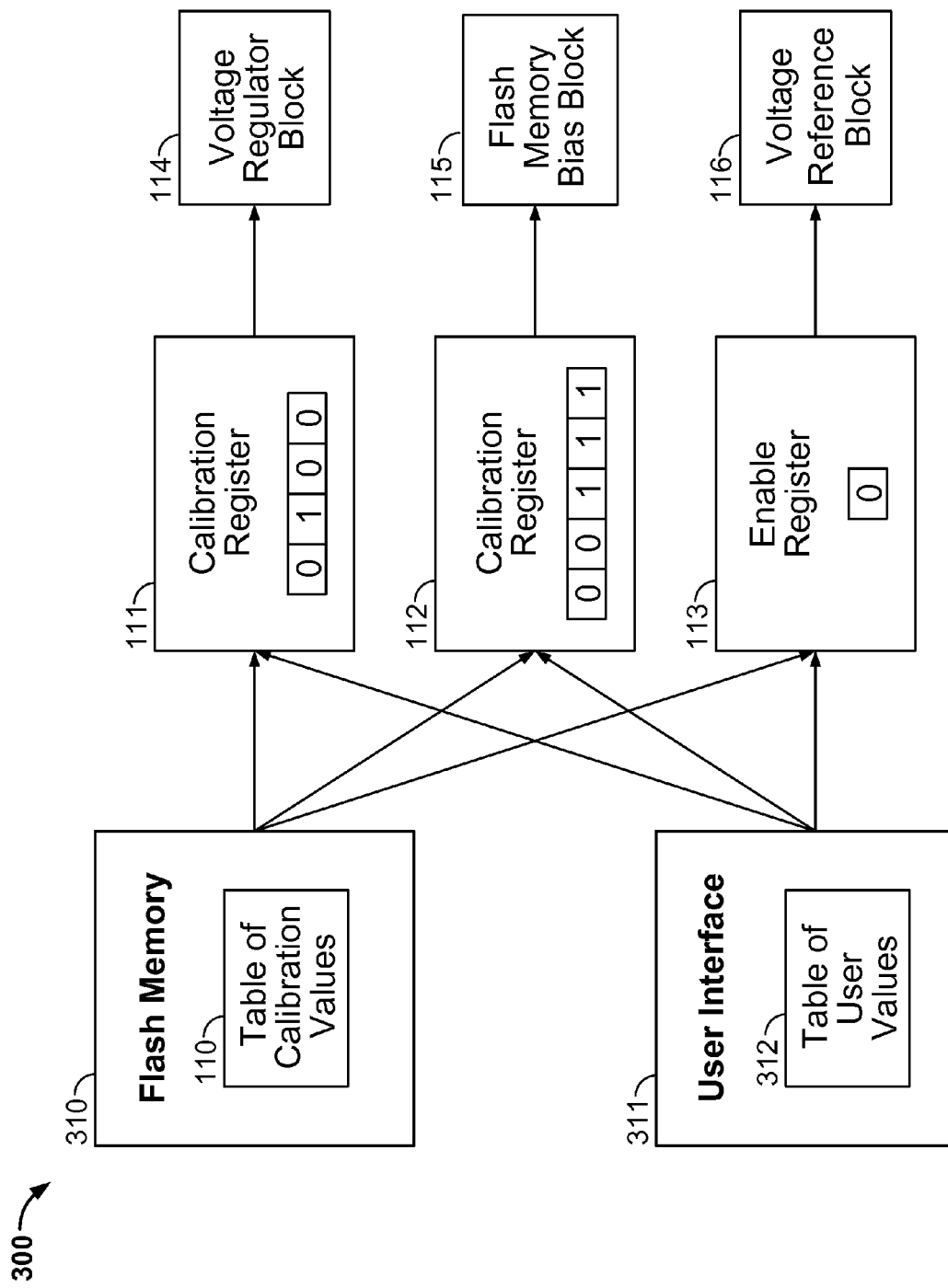
FIG. 3 is block diagram of an example microcontroller system including a user interface.

FIG. 3 is block diagram of an example microcontroller system 300 including a user interface 311. The system includes the logic blocks 114-116 of FIG. 1 and the calibration registers 111, 112, and 113 of FIG. 1. The system also includes the table of calibration values 110 of FIG. 1, stored in a reserved portion of flash memory 310, e.g., a fuse table. The fuse table can be programmed at the factory during manufacturing the system.

When the microcontroller system changes between a primary power mode and a secondary power mode, or between a run sub-mode and a sleep sub-mode, the microcontroller system reads calibration values from the table of calibration values and write the calibration values to the configuration registers. The logic blocks, in turn, read the calibration values from the configuration registers and calibrate their respective components accordingly.

For example, a power manager module can read and write the calibration values, without any intervention from the user interface. This is useful, for example, because software does not need to be maintained or updated, and a user system does not need implementation details for the system.

Nonetheless, the user system can use the user interface 311 to override the calibration values that are written to the calibration registers. For example, a user system can populate a table of user values 312, which can then be written, e.g., directly by the user interface or by processor or a power manager module, to the calibration registers. This is useful, for example, for user systems that require more specific control of the logic blocks and their respective components.

Example Flowchart-Changing Power Configurations

Figure 4:
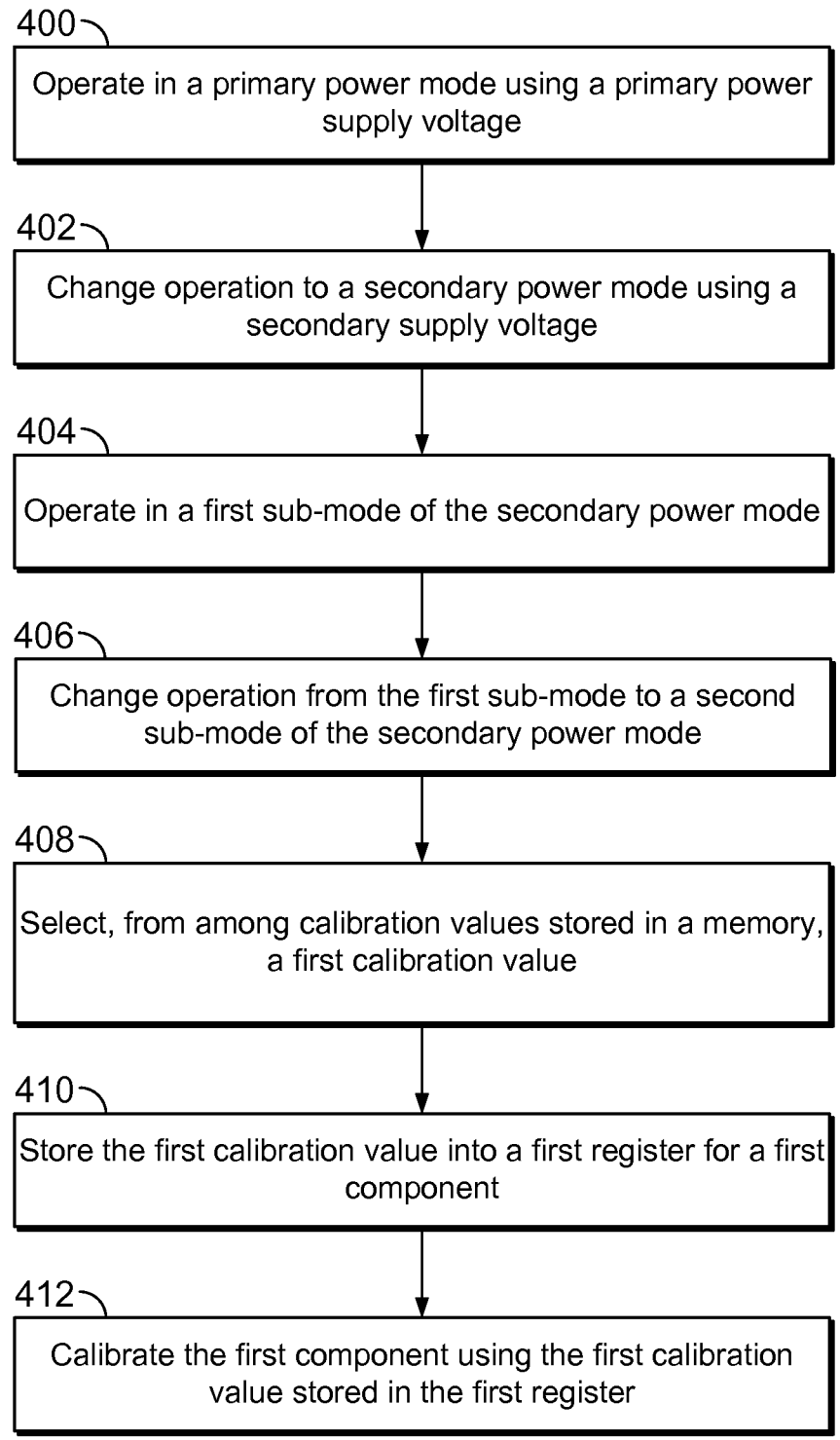
FIG. 4 is a flow diagram of an example process performed by a microcontroller system.

FIG. 4 is a flow diagram of an example process performed by a microcontroller system. The microcontroller system can be the microcontroller system 100 of FIG. 1 and can include, for example, a power manager module or a processor.

The microcontroller system operates in a primary power mode using a primary power supply voltage (400). The primary power supply can be, for example, a system voltage. The microcontroller can operate in either a first or second sub-mode of the primary power mode, e.g., a run mode or a sleep mode.

The microcontroller system changes operation to a secondary power mode using a secondary power supply voltage (402). The secondary power supply voltage can be, for example, a low power voltage, lower than the system voltage, for saving power. In response to changing modes, the microcontroller system loads new calibration values into calibration registers, as described further below with reference to steps 408-412.

The microcontroller system operates in a first sub-mode of the secondary power mode, e.g., a run sub-mode (404). The microcontroller system changes operation from the first sub-mode to a second sub-mode of the secondary power mode, e.g., a sleep sub-mode (406). In response to changing modes, the microcontroller loads new calibration values into calibration registers by taking the following actions.

The microcontroller system selects, from among calibration values stored in a memory, a first calibration value for a first component (408). The memory can be system configuration storage, e.g., a reserved portion of flash memory. The system selects the first calibration value using the current mode and sub-mode, which in this example is the secondary power mode and the second sub-mode. If the microcontroller system includes other components that use calibration values that change in response to changing power modes, the microcontroller system can also read values for those other components.

The microcontroller stores the first calibration value into a first calibration register for the first component (410). If the system reads any other values for any other components, the system writes those values to respective calibration registers for those components. The microcontroller system calibrates the first component using the first calibration value stored in the first calibration register (412). For example, a logic block for the first component can read the first calibration value and calibrate the first component.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller configured to operate in a primary power mode using a primary supply voltage and a secondary power mode using a secondary supply voltage, the microcontroller being configured to operate in first and second sub-modes of each power mode, the microcontroller comprising:
a first configuration storage register configured to store a calibration value;
a first component configured to read the calibration value and calibrate, according to the calibration value, for running in a first operation state or a second operation state, the first component configured to run in the first operation state or the second operation state based on whether the microcontroller is operating in the first or second sub-mode or based on whether the microcontroller is operating in the primary or secondary power mode; and
system configuration storage storing, for each of a plurality of components including the first component, a mode specific calibration value for each of the first and second sub-modes for each of the primary and secondary power modes of the microcontroller;
wherein the microcontroller is configured to, in response to changing from a previous mode to a present mode, read a present calibration value associated with the first component and corresponding to the present mode from the system configuration storage and write the present calibration value to the first configuration storage register, and wherein the first component is configured to read the present calibration value from the first configuration storage register and calibrate, according to the present calibration value, for running in the first operation state or the second operation state based on the present mode of the microcontroller.

2. The microcontroller of claim 1, further comprising flash memory, wherein the system configuration storage is a portion of the flash memory dedicated to storing the calibration values for each of the first and second sub-modes for each of the primary and secondary power modes.

3. The microcontroller of claim 2, wherein the first component is a flash memory controller coupled to the flash memory and configured to read the calibration value from the configuration storage register and, depending on the calibration value, calibrate to adjust a flash memory bias voltage for the flash memory.

4. The microcontroller of claim 3, further comprising:
a second configuration storage register configured to store a second calibration value;
a third configuration storage register configured to store a third calibration value;
a voltage regulator component configured to read the second calibration value and calibrate, according to the second calibration value, the voltage regulator component for running in a first operation state or a second operation state, the voltage regulator component configured to run in the first operation state or the second operation state based on the whether the microcontroller is in the primary power mode or the secondary power mode;
a reference voltage component configured to read the third calibration value and enable, according to the third calibration value, the reference voltage component, the reference voltage component configured to run in a first operation state or a second operation state based on whether the microcontroller is operating in the first or second sub-mode;
wherein the microcontroller is configured to, in response to changing from the previous power mode to the present power mode, read a second present calibration value corresponding to the present power mode from the system configuration storage and write the second present calibration value to the second configuration storage register; and
wherein the microcontroller is configured to, in response to changing from a previous sub-mode to a present sub-mode, read the third calibration value corresponding to the present power mode from the system configuration storage and write the third present calibration value to the third configuration storage register.

5. The microcontroller of claim 4, wherein the voltage regulator is configured to adjust the voltage regulation setting by calibrating a trim value according to the second calibration value, and wherein the reference voltage component is a bandgap reference.

6. The microcontroller of claim 4, wherein:
the voltage regulator is configured to operate in the first operation state during the primary power mode, and the voltage regulator is configured to operate in the second operation state during the secondary power mode;
the flash memory controller is configured to operate in a first operation state during the primary power mode, and the flash memory controller is configured to operate in the second operation state during secondary power mode; and
the reference voltage component is configured to operate during the first sub-mode and to turn off during the second sub-mode.

7. The microcontroller of claim 1, wherein:
the microcontroller is configured to enable changing sub-modes while in the primary and secondary power modes;
the microcontroller is configured to enable changing power modes while operating in the first sub-mode; and
the microcontroller is configured to disable changing power modes while operating in the second sub-mode.

8. The microcontroller of claim 1, further comprising a user interface, the microcontroller configured to receive a user value through the user interface, the microcontroller also configured to store the user value into the first configuration storage register.

9. A method performed by a microcontroller, the method comprising:
operating in a primary power mode using a primary supply voltage;
changing operation from the primary power mode to a secondary power mode using a secondary supply voltage lower than the primary supply voltage;
operating in a first sub-mode of the secondary power mode; and
changing operation from the first sub-mode to a second sub-mode of the secondary power mode, including:
selecting, from among a plurality of calibration values stored in a memory, a first calibration value for the second-mode or the secondary power mode or both, the first calibration value being associated with a first component in the microcontroller, the memory storing, for each of a plurality of components including the first component, a mode specification calibration value for each of the first and second sub-modes for each of the primary and secondary power modes of the microcontroller;

storing the first calibration value into a first register for the first component; and calibrating the first component according to the stored first calibration value for running in a first operation state or a second operation state based on the second sub-mode of the secondary power mode of the microcontroller;

wherein the first component is configured to run in the first operation state or the second operation state based on whether the microcontroller is operating in the first or second sub-mode or whether the microcontroller is operating in the primary or secondary power mode.

10. The method of claim 9, further comprising:

powering the first component with the primary supply voltage to operate the first component in a first operation state; and powering the first component with the secondary supply voltage to operate the first component in a second operation state.

11. The method of claim 9, further comprising: enabling operation of a reference voltage component when the microcontroller operates in the first sub-mode; and disabling operation of a reference voltage component when the microcontroller operates in the second sub-mode.

12. The method of claim 9, wherein:

the first component is a flash memory controller configured to adjust a bias voltage in a flash memory;

the microcontroller comprises a voltage regulator component configured to calibrate a voltage regulator circuit; and the microcontroller comprises a reference voltage component configured to enable and disable a reference voltage circuit.

13. The method of claim 12, wherein changing operation from the first sub-mode to the second sub-mode further comprises:

selecting, from among the plurality of calibration values stored in the memory, a second calibration value for storage in a second register; and selecting, from among the plurality of calibration values stored in the memory, a third calibration value for storage in a third register;

calibrating the voltage regulator component to adjust the bias setting according to the second calibration value; and enabling or disabling the reference voltage component according to the third calibration value.

14. The method of claim 13, wherein:

the first calibration value is selected based on whether the microcontroller is in the primary power mode or the secondary power mode;

the second calibration value is selected based on whether the microcontroller is in the primary power mode or the secondary power mode; and the third calibration value is selected based on whether the microcontroller is in the first sub-mode or the second sub-mode.

15. The method of claim 13, further comprising: receiving one or more user values; and storing one or more of the user values into at least one of the first, second, and third registers.

16. The method of claim 9, where the microcontroller is configured to:

change sub-modes while operating in the primary power mode;

change sub-modes while operating in the secondary power mode; and change power modes while operating in either of the run sub-modes; and disable changing power modes while operating in either of the sleep sub-modes.

17. A microcontroller comprising:

a plurality of components each including respective configuration registers;

a system configuration storage configured to store power mode specific calibration data for each of the plurality of components; and a power manager configured to, in response to a power mode change, read one or more calibration data from the system configuration storage and write the one or more calibration data into one or more configuration registers of the plurality of components, wherein, upon in response to the writing of the one or more calibration data into the one or more configuration registers, one or more components of the plurality of components corresponding to the one or more configuration registers are calibrated according to the one or more calibration data; wherein the microcontroller is configured to operate in a primary power mode using a primary supply voltage and a secondary power mode using a secondary supply voltage and operate in first and second sub-modes of each power mode; wherein the system configuration storage is configured to store, for each of the plurality of components, a mode specific calibration value for each of the first and second sub-modes for each of the primary and secondary power modes.

18. The microcontroller of claim 17, wherein each of the plurality of components is configured to read a calibration value in the respective configuration register and calibrate, according to the calibration value, for running in a first operation state or a second operation state, the component configured to run in the first operation state or the second operation state based on whether the microcontroller is operating in the first or second sub-mode or based on whether the microcontroller is operating in the primary or secondary power mode.

* * * * *